United States Patent
Markulec et al.

(10) Patent No.: US 6,231,260 B1
(45) Date of Patent: May 15, 2001

(54) MOUNTING PLANE FOR INTEGRATED GAS PANEL

(75) Inventors: Jeffrey R. Markulec, San Jose; Dennis G. Rex, Sunnyvale; Richard E. Schuster, Milpitas; Brent D. Elliot, Cupertino, all of CA (US)

(73) Assignee: Insync Systems, Inc., Milpitas, CA (US)

( * ) Notice: Subject to any disclaimer, the term of this patent is extended or adjusted under 35 U.S.C. 154(b) by 0 days.

(21) Appl. No.: 08/893,773

(22) Filed: Jul. 11, 1997

(51) Int. Cl.[7] .................................................. F16B 5/00
(52) U.S. Cl. ......................... 403/24; 403/374.3; 137/884
(58) Field of Search .................................... 403/381, 334, 403/409.1, 404, 24, 13, 14, 370, 374.1, 374.2, 374.3; 411/84, 85, 104; 137/884, 271

(56) References Cited

U.S. PATENT DOCUMENTS

| | | | |
|---|---|---|---|
| 744,559 | * 11/1903 | Kendrick | 411/85 X |
| 2,336,044 | * 12/1943 | Stuart | 403/381 X |
| 3,828,422 | * 8/1974 | Schmitt | 411/399 X |
| 3,915,194 | 10/1975 | Friedrich | 137/608 |
| 4,057,294 | * 11/1977 | Krekeler | 403/381 X |
| 4,370,081 | * 1/1983 | Briles | 403/404 X |
| 4,605,340 | * 8/1986 | Stephan | 403/381 X |
| 4,657,047 | 4/1987 | Kolibas | 137/881 |
| 4,681,476 | * 7/1987 | Mischenko | 403/381 X |
| 4,687,425 | * 8/1987 | Takano et al. | 403/381 X |
| 4,702,658 | * 10/1987 | Salter | 411/399 X |
| 4,711,594 | * 12/1987 | Agee | 403/334 X |
| 5,025,834 | * 6/1991 | Stoll | 137/884 X |
| 5,275,074 | * 1/1994 | Taylor et al. | 403/409.1 X |
| 5,301,717 | 4/1994 | Goedecke | 137/884 |
| 5,368,062 | 11/1994 | Okumura et al. | 137/240 |
| 5,439,026 | 8/1995 | Moriya et al. | 137/486 |
| 5,647,685 | * 7/1997 | Fukui et al. | 403/374.4 X |
| 5,836,355 | * 11/1998 | Markulec et al. | 137/884 |

FOREIGN PATENT DOCUMENTS

153065 * 12/1979 (JP) ....................................... 403/381

OTHER PUBLICATIONS

Advertising material by Ultra Clean Technology; dated at least Jul., 1994; 7 pp. total.
PCT International Search Report in connection with International Application No. PCT/US98/11574 mailed Oct. 2, 1998 (7 Pages).

* cited by examiner

Primary Examiner—Harry C. Kim
(74) Attorney, Agent, or Firm—Wolf, Greenfield & Sacks, P.C.

(57) ABSTRACT

A mounting plane technology for a gas panel comprising a plurality of discreet blocks. The mounting plane of the present invention includes a track and a centering element. The centering element glides along the tracks such that modular blocks may be anchored to any position along the track. Centering elements are easily added to and removed form tracks thus maximizing the speed and flexibility of configuring or reconfiguring the modular blocks. The centering element and track have a geometrical symmetry that allows for highly precise anchoring of the modular block with respect to the mounting plane. The centering element is harder than the plane material and has grooves to increase the friction between the plane and centering element when the modular block is anchored. Centering elements are deliberately manufactured with a slight asymmetry with respect to the track so that high manufacturing yield is guaranteed. Tracks have devices that enable the centering elements to hold their place against undesired forces.

29 Claims, 11 Drawing Sheets

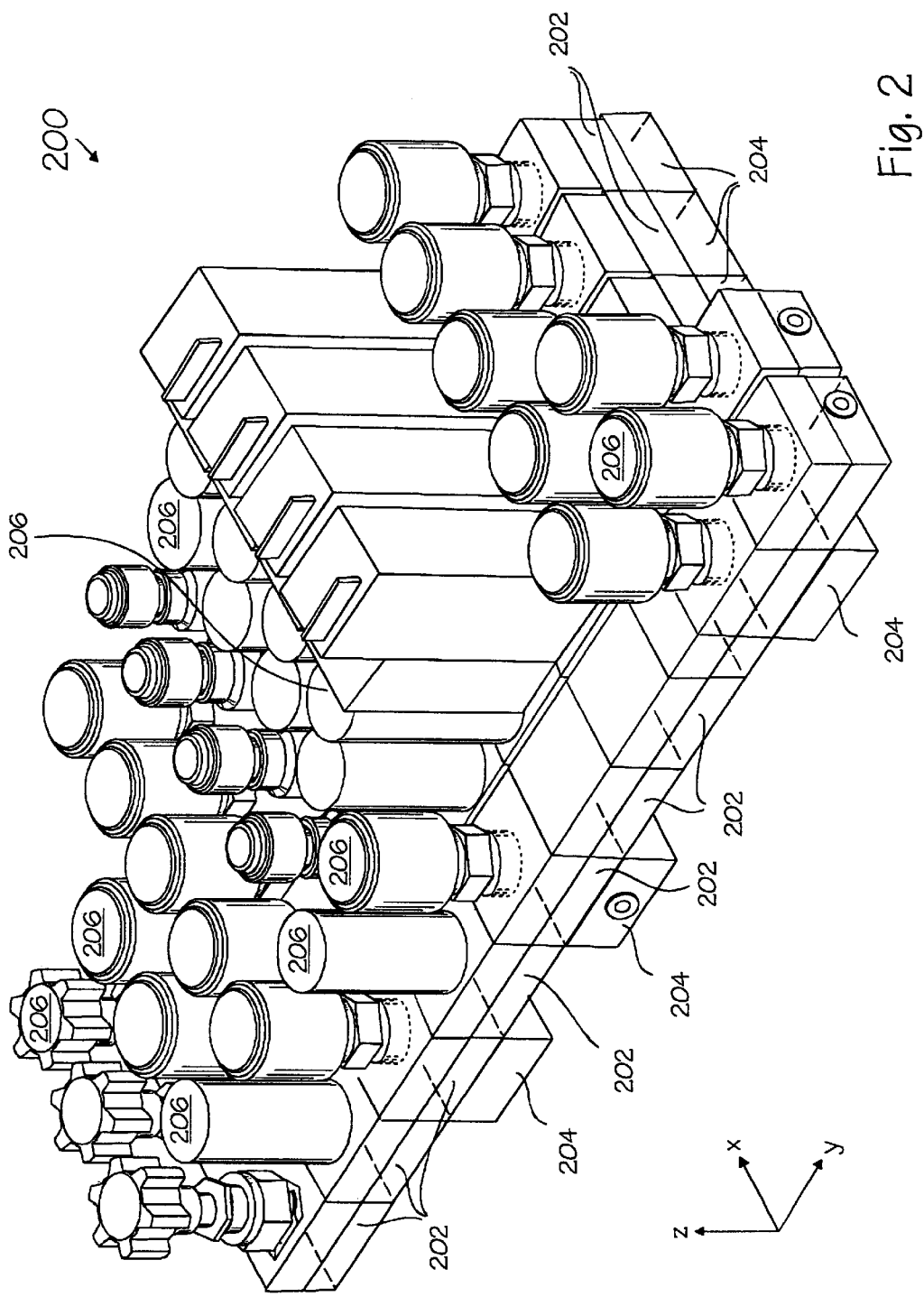

MOUNTING PLANE FOR INTEGRATED GAS PANEL

BACKGROUND OF THE INVENTION

1. Field of the Invention

The present invention relates to the field of gas delivery systems, and more specifically to the mechanism of attachment and reconfiguration of a plurality of blocks which provide the gas routing conduits and passages for a gas panel.

2. Discussion of Related Art

Gas panels are used to control the flow of gases and gas mixtures in many manufacturing processes and machinery. A typical gas panel, such as gas panel 100 shown in FIG. 1, is made up of literally hundreds of discreet or individual components, such as valves 102, filters 104, flow regulators 106, pressure regulators 107, pressure transducers 109, and connections 108, connected together by tens (or hundreds) of feet of tubing 110. Gas panels are designed to provide desired functions, such as mixing and purging, by uniquely configuring the various discreet components.

A problem with present gas panels is that most of them are uniquely designed and configured to meet specific needs. Today there is simply no standard design in which gas panels are configured. Today it takes weeks to months to design a gas panel, fabricate all subassemblies, and then assemble the final product. Uniquely designing or configuring each new gas panel costs time and money. Additionally, the lack of a standard design makes it difficult for facilities' personnel to maintain, repair, and retrofit all the differently designed gas panels which may exist in a single facility. The unique designs require an intensive manual effort which results in a high cost to the customer for customized gas panels. Customized gas panels also make spare parts inventory management cumbersome and expensive.

Another problem with present gas panels is a large number of fittings 108 and welds required to interconnect all of the functional components. When tubes are welded to fittings 108, the heat generated during the welding process physically and chemically degrades the electropolish of the portion of the tube near the weld (i.e., the heat affected zone). The degraded finish of the heat affected zone can then be a substantial source of contaminant generation. Additionally, during the welding process metal vapor, such as manganese, can condense in the cooler portions of the tube and form deposits therein. Also, if elements being welded have different material composition (e.g., stainless steel with inconel), desired weld geometry and chemical properties are difficult to achieve. Thus, gas panels with large numbers of fittings and welds are incompatible with ultra clean gas systems which require extremely low levels of contaminants and particles. Additionally, high purity fittings 108 are expensive and can be difficult to obtain, thereby increasing the cost of any gas panel incorporating them.

Yet another problem associated with present gas panel designs is the large amount of tubing 110 used to route gas throughout the gas panel. Large volumes of tubing require large volumes of gas to fill the system and make it difficult to stabilize and control gas flows. Additionally, gas panels with excessive tubing require significant amounts of time to purge and isolate which can result in expensive downtime of essential manufacturing equipment, resulting in an increase in the cost of ownership. Still further, the more tubing a gas panel has, the more "wetted surface area" it has, which increases its likelihood of being a source of contamination in a manufacturing process.

U.S. patent application Ser. No. 08/760,150 filed on Dec. 3, 1996 has addressed the above issues by disclosing, as shown in FIGS. 2 and 3, modular building blocks for an integrated gas panel. The use of such building blocks greatly simplify the design and reduce the technical shortcomings associated with current gas panel technology. This invention relates to the mechanism employed for mounting the modular blocks. It is possible to mount the modular building blocks by individually drilling and tapping mounting holes in a customized pattern into a planar base fixture. Such a customized mounting plate will anchor the modular blocks with sufficient accuracy such that the low tolerance requirements of the block to block misalignment (+/−0.003") are met. However, customized drilling is both expensive and time consuming. Furthermore, easy reconfiguration of an existing gas panel is impossible if the reconfigured gas panel design has a different mounting hole footprint than the previous gas panel design. A breadboard-like mounting plate with pre-drilled and tapped mounting holes located at periodic locations on the mounting plate is also possible. Such a mounting plate eliminates the wasted time and money devoted to a customized mounting plate. However, a breadboard like design limits the total number of possible configurations on a mounting plate. That is, the modular blocks are not capable of being anchored at any of a continuous range of positions, but rather, their positions are limited to the relatively few discrete locations that are determined by the placement of the pre-drilled holes. Furthermore, a breadboard-like mounting plate forces the dimensions of the modular blocks to conform to the dimensions of the periodical spacing of the pre-drilled holes. This results in wasted space and possibly incompatible downstream product offerings. Additionally it is highly desirable to have a mounting technology that allows for the reconfiguration of gas panel even if the gas panel is fixed in a vertical position (for example on a wall). Such a capability would not even require that the gas panel be taken down in order to be reconfigured.

Thus, what is desired is a versatile mounting technology for a modular gas system that: 1) is easy to manufacture; 2) allows for rapid configuration or reconfiguration of a gas panel; 3) maximizes the available positions where modular blocks may be mounted; 4) allows for highly precise anchoring of modular blocks and 5) allows for reconfiguration even if the mounting fixture remains fixed in a vertical position.

SUMMARY OF THE INVENTION

The present invention is a mechanism for rapidly configuring (or reconfiguring) and accurately mounting to a planar surface a set of uniquely ported and passage routed modular blocks which can be coupled together to form a weldless and tubeless gas panel. This mechanism maximizes the positions where the modular blocks may be placed, allows for easy and rapid configuration or reconfiguration and also allows the gas system to be configured while the mounting fixture is vertical. Each embodiment consists of lengthwise tracks and centering elements. The centering elements run along the length of the tracks and precisely anchor the modular blocks at any position across the length of each track. The mechanism for centering the modular blocks with high precision involves moving a centering element with a narrowing width into a cavity with substantially the same narrowing width. As the centering element presses snug against the wall of the cavity its location with respect to the mounting plane is centered within the cavity. Additionally, the centering elements have grooves on the surface that interface with the cavity wall in order to increase the friction at the interface resulting in a stronger anchor for the modular blocks. Additionally the cavity material is softer than the centering element. Again, this results in stronger anchoring. Further still, the narrowest width of the centering element is larger than the smallest width of the cavity so that the centering element does not distort or pull through an opening in the cavity. Furthermore, the centering elements are purposely manufactured such that their width narrows at a slightly greater rate than the rate at which the cavity narrows. This ensures that all centering elements will fit inside all cavities, thus manufacturing yield is maximized. Finally, the centering elements may be held vertically by the use of springs that press the centering elements against the walls of the cavity.

BRIEF DESCRIPTION OF THE DRAWINGS

FIG. 2 is an illustration of a gas panel comprising modular building blocks.

DETAILED DESCRIPTION OF THE PRESENT INVENTION

Figure 1:
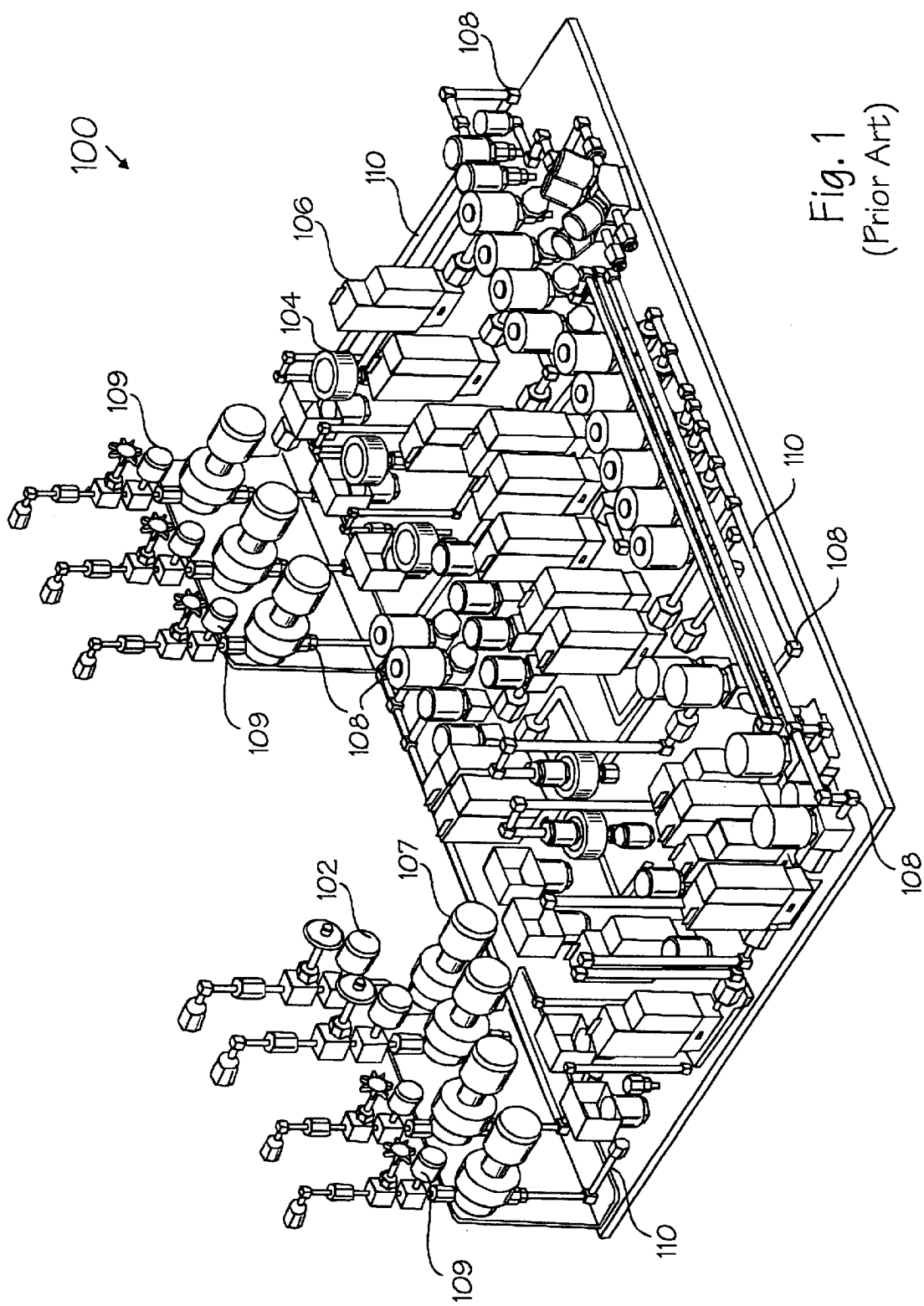
FIG. 1 is an illustration of a standard gas panel which utilizes tubing and welds to interconnect the various functional components.

The present invention describes a novel mechanism for mounting a set of modular blocks which can be interconnected together to form a gas panel having a variety of different functions and capabilities. In the following description numerous specific details are set forth, such as particular fixtures, components, and mounting plane designs, in order to provide a thorough understanding of the present invention. It will be obvious, however, to one skilled in the art that the present invention may be practiced without these specific details. In other instances well known mechanical assembly, machining and manufacturing techniques have not been set forth in particular detail in order to not unnecessarily obscure the present invention.

The present invention is a versatile mounting plane having numerous tracks that guide centering elements. The modular blocks are then mounted to the centering elements. Not only do the centering elements and tracks allow for a continuous range of locations where a modular block may be placed on a track, they also serve as a mechanism for achieving highly precise anchoring of the modular block to the planar structure. Additionally, the building blocks may be quickly and easily configured or reconfigured on a mounting plane. That is, the tracks and centering elements are deliberately designed so that the centering elements: 1) are easily removed or added to tracks; 2) easily glide along any track across a continuous range of positions and 3) are used to quickly mount the modular block to the mounting plane. In this sense, a versatile plane ("mounting-plane") is realized that substantially eliminates the inefficiencies associated with traditional gas panels. Additionally, the tracks may contain a spring that is designed to prevent the movement of centering elements against undesired forces (such as gravity or external shock) that act to move the centering element along the track. Additionally, the mounting plate may be reduced to a single track so that individual gas sticks may be built. These individual sticks may then be added to a larger framework capable of holding many such single track mounts in order to form a complex integrated gas system.

The present invention is a mounting-plane mounting apparatus for a set of uniquely ported discrete building blocks which, when interconnected together, form all of the conduit and manifold routing required for a complete gas panel. The building blocks can be coupled together to form gas panels, such as gas panel 200 shown in FIG. 2, which can provide all of the different functions and capabilities required of current gas panels. Gas panel 200 shown in FIG. 2 includes a plurality of modular base blocks 202 which have a standard component interconnection face. A plurality of modular base blocks are coupled together to form a common conduit or gas stick 207. A plurality of manifold blocks 204 are coupled together in a direction transverse to the coupling of the base blocks to form a common manifold or passage, which runs transverse to the conduits or gas sticks formed by coupled adjacent base blocks. The manifold blocks are coupled to the under side of base blocks (i.e., to the side opposite to the side on which the component 206 is mounted) and allow for fluid communication between the individual gas sticks.

The common or standard port locations for the base blocks 202, manifold blocks 204, and assorted functional elements 206 enable neighboring blocks and/or elements to contribute to a continuous gas system. In order to construct such a system, neighboring base blocks 202 and/or manifold blocks 204 must be anchored to the mounting plane 208 with a high degree of precision.

Figure 3A:
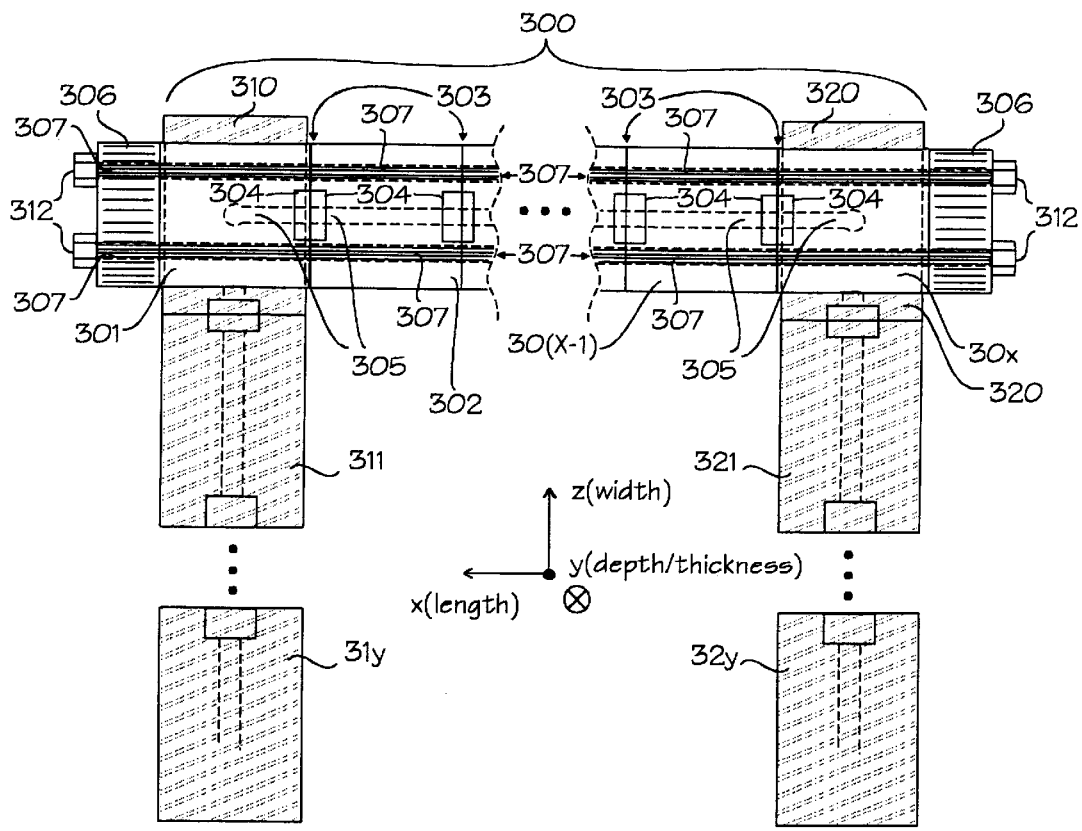
FIGS. 3a and 3b is an illustration of a gas stick comprising modular building blocks.
Figure 3B:
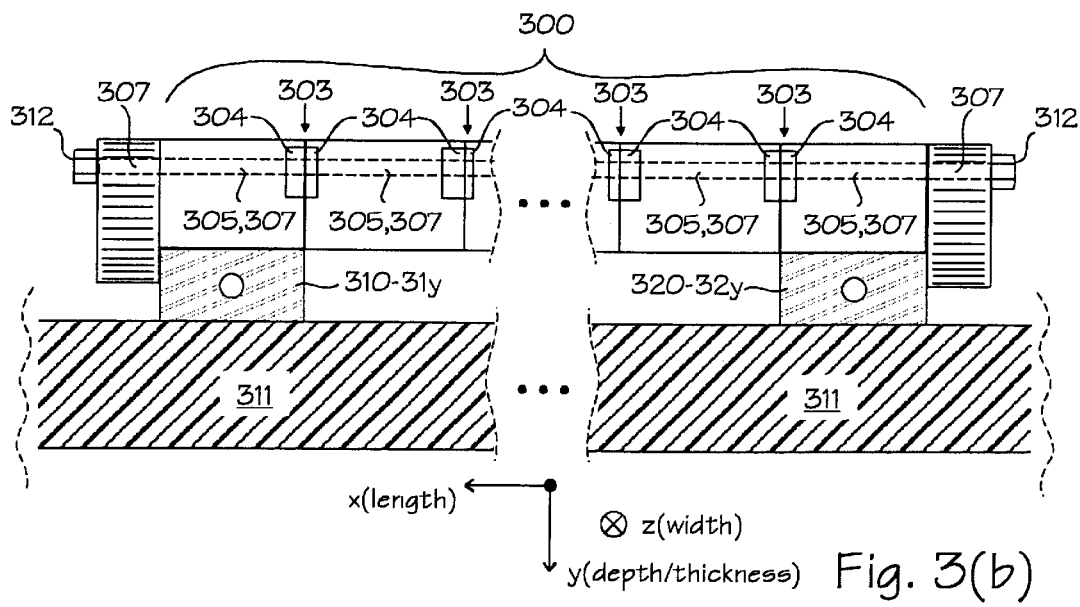
Figure 3C:
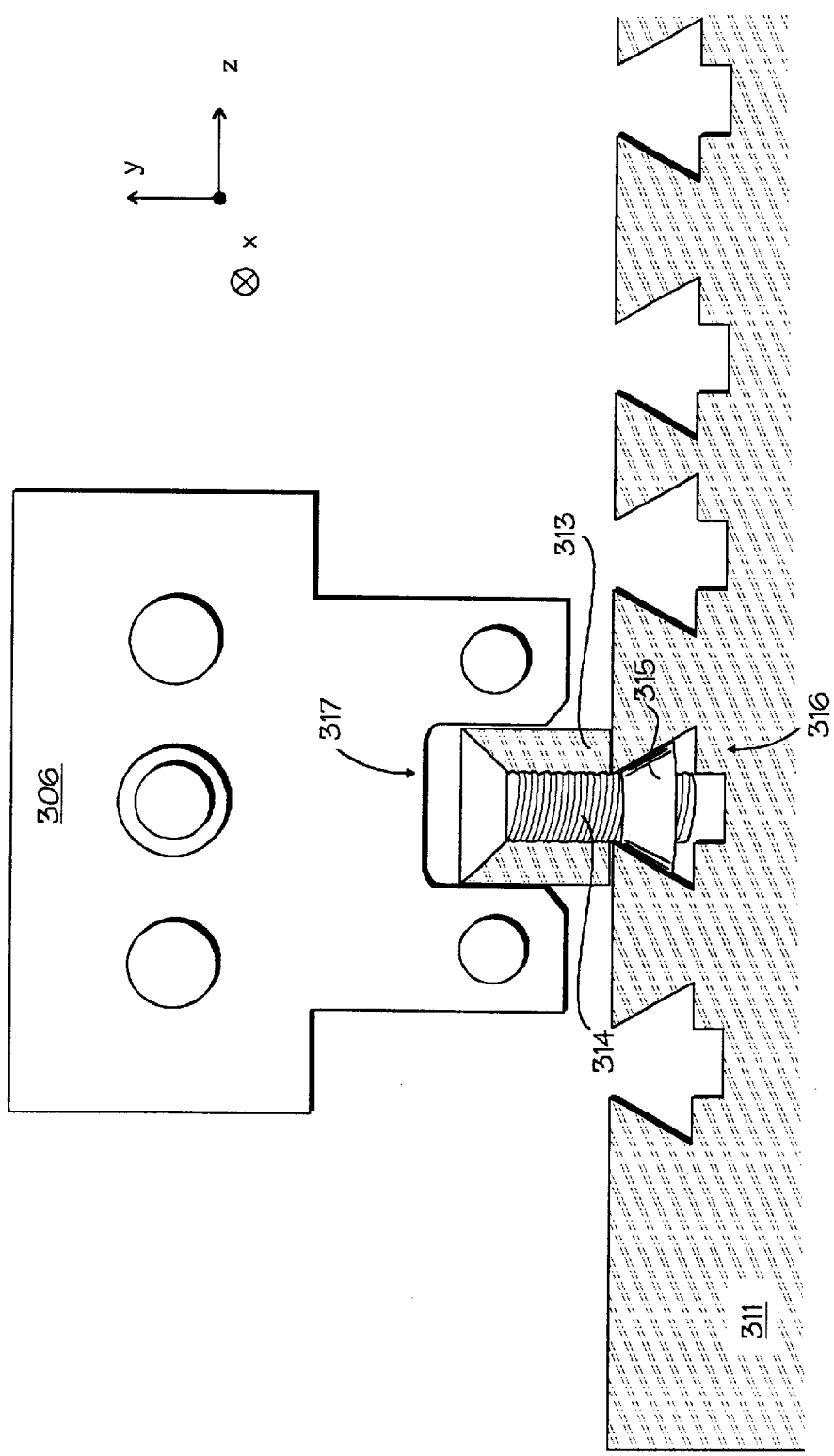
FIG. 3c is an illustration of an end plate of a gas stick aligned on the mounting plane with an alignment pin.

FIGS. 3a and 3b show a gas stick 300 composed of neighboring base blocks 301 through 30x. FIG. 3a shows a top view and FIG. 3b shows a side view. Beneath the base blocks 301 and 30x are manifold blocks 310 through 31y and 320 through 32y. At the interfaces 303 of the base blocks, the gas port 304 on each face must be aligned with sufficient precision to properly couple the gas lines 305 that are located within each base block 301 through 30x. That is, a gas stick is a continuous channel for gas that is made up of a plurality of blocks. In order for the gas system to be properly functional, the blocks must have minimal misalignment with respect to the ports on the face of neighboring blocks. Furthermore, the interface between neighboring blocks must be tight enough to form a sufficient seal. In order to accomplish this, the base blocks 301 through 30x are lined up on a separate alignment fixture (not shown). The alignment fixture is a corner-like bracket (e.g. two metal planes that meet at a 90 degree angle). The alignment fixture is used to align the base blocks 301 through 30x that make up a gas stick 300. When the base blocks 301 through 30x are aligned on the alignment fixture, end plates 306 are added on both ends of the gas stick 300. Each base block also has a pair of holes that are located on both sides of the gas port 304. These holes run through the end plate 306 and each base block, along the x axis. Two bolts 307 are inserted through each pair of holes for each base block 301 through 30x, through the entire length of the gas stick 300, while the base blocks 301 through 30x are aligned on the alignment fixture. Bolts 307 are double threaded so that nuts 312 may be threaded on each end of each bolt 307. Nuts 312, when tightened, press end plates 306 and base blocks 301 through 30x against one another tightly such that a tight seal at ports 304 at each block to block interface 303 is formed. Bolts 307 and the alignment fixture help preserve the block to block alignment of gas stick 300 while nuts 312 are tightened against the end plate 306. After the nuts 312 are tightened and the gas stick is removed from the alignment fixture the gas stick 300 is ready to be mounted to the mounting plane 311. The bottom of end plates 306 do not touch the surface of the mounting plane 311 allowing manifold blocks 310 through 31y and 320 through 32y to run transverse to the gas stick 300 between the gas stick 300 and the mounting plane 311. The gas sticks 300 are mounted to the manifolds 310 and 320 at base blocks 301 and 30x. Alignment pins 313, shown in FIG. 3c, are used to ensure that the gas stick 300 is properly aligned to the lengthwise (x) axis prior to the gas stick being mounted to manifold blocks 310 and 320. Alignment pins 313 are mounted to a track 316, as shown in FIG. 3c, with a alignment pin bolt 314 and dovetailed shaped nut 315. As will be discussed later, the shape of the track 316 and the shape of the dovetailed shaped nut 315 guarantee that the alignment pin bolt 314 and the alignment pin 313 are centered in the middle of the track 316. Alignment pins 313 are centered to the track 316 on either end of the gas stick 300 so that when bridge 317 on the underside of the end plate 306 slips over the alignment pin 313 the gas stick is also aligned on the track (i.e. x axis). The bottom of the end plate 306 does not touch the surface of the mounting plane so that the gas stick 300 is easily aligned to the x axis and so that the manifold blocks may pass underneath the gas stick 300. Referring back to FIGS. 3a and 3b, in order to secure proper alignment, the mounting technology, not only of the base blocks 301–30x to each other or the base blocks 301 and 30x to manifold blocks 310 and 320, but also of the manifold blocks 310 and 320 to the mounting plane 311 is critical. Specifically, there must be negligible deviation, with respect to manifold block 310, of the position of manifold block 320 in the y and z directions. Furthermore, the blocks must be easily and quickly placed and anchored to various positions on the mounting plane 311. FIG. 3 illustrates the requirements that drive the tolerance specifications for the placement of the basic elements in a modular gas system.

FIG. 3 is not intended to limit the numerous other configurations and elements that may be used to form such a gas system. Clearly, other configurations, blocks, manifolds and functional elements are conceivable. For example, end plates 306 may be designed to mount to the mounting plane 311 directly, gas sticks may be created by base blocks that mount directly to the mounting plane without a manifold, various elements may be coupled to the mounting plane with the assistance of an elbow bracket that mounts directly to the mounting plane, etc. For this reason, all elements that may possibly be mounted to the mounting plane, either with their current design or with a modification to their current design, will be now be referred to as "modular blocks".

Figure 4:
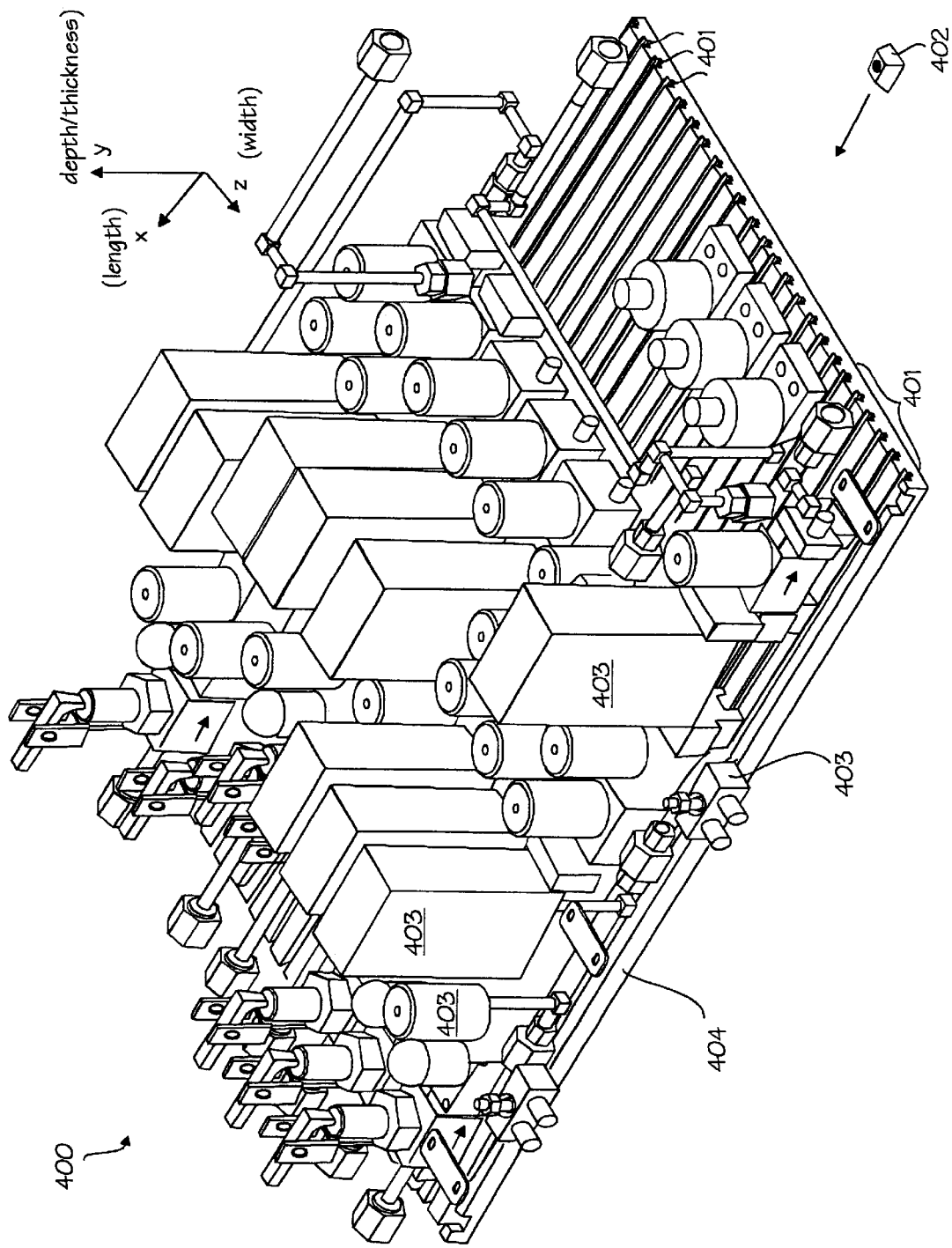
FIG. 4 is an illustration of a gas panel comprising modular building blocks and a novel mounting plane system.

Various embodiments exist according to the present invention; however, all the embodiments have two essential features: centering elements and tracks. FIG. 4 shows a gas panel 400 created by the present invention. Numerous tracks 401 are shown. Centering elements 402 are not visible when they anchor the modular blocks 403 because they reside beneath the modular blocks 403 inside the track 401. A subset of the elements labeled as modular blocks 403 in FIG. 4, as shown, do not mount directly to the mounting plane 404. However, as previously stated, it is conceivable that these blocks may, with some modification, have such a capability. As such, they are all labeled as modular blocks 403. Tracks 401 run along the lengthwise (x) dimension. For the reasons already discussed, there is a very limited tolerance for curvature of the tracks 401. Typically, no more than 0.002" to 0.003" per foot is acceptable. The tracks 401 serve as the primary reference for the placement of modular blocks 403 with respect to the surface of the mounting plane 404. The centering elements 402 are designed such that they easily add to, separate from, move upon and anchor to the tracks. Furthermore, the relative geometries of the tracks 401 and centering elements 402 are such that the centering elements may be anchored within a +/–0.003" tolerance in the z direction. The centering elements 402 are coupled, either directly or indirectly, to the modular blocks 403. In the preferred embodiment there are at least two centering elements used to anchor a modular block on at least two separate tracks. The result is a mounting plane system with the capability to rapidly and easily place and replace modular blocks 403 with negligible relative deviation across the surface of the mounting plane 404.

As discussed, requirements of a mounting plane system include: 1) the ease of manufacture; 2) the ability to easily and rapidly add or remove centering elements from tracks located in the mounting plane and 3) the ability to place the modular block anywhere within a continuous range of locations.

Figure 5A:
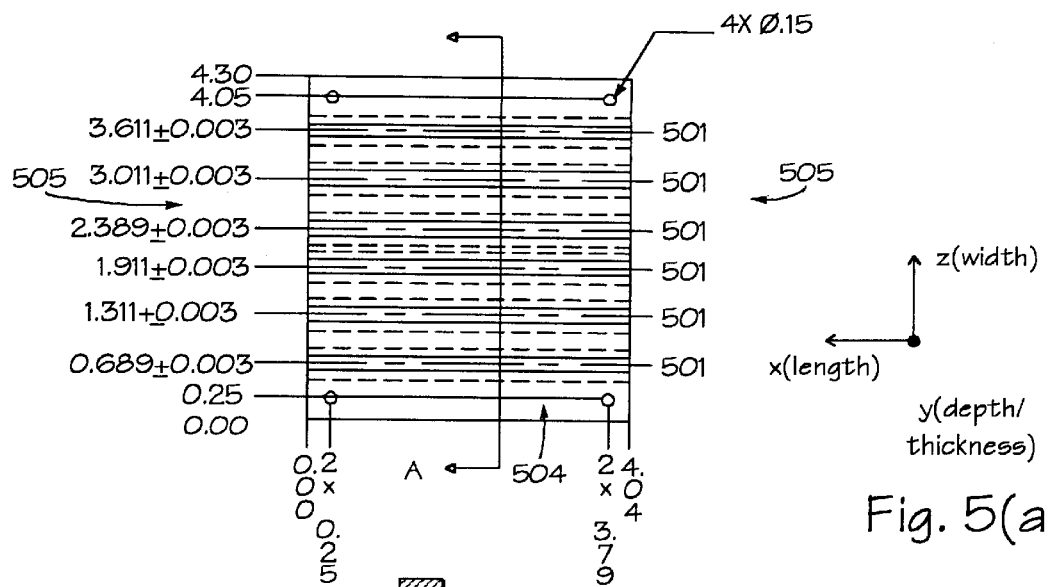
FIGS. 5a, 5b and 5c are illustrations of the preferred mounting plane.
Figure 5B:
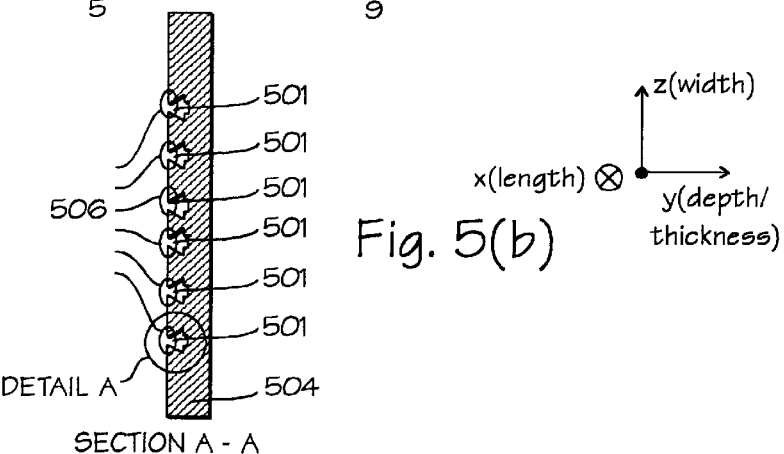
Figure 5C:
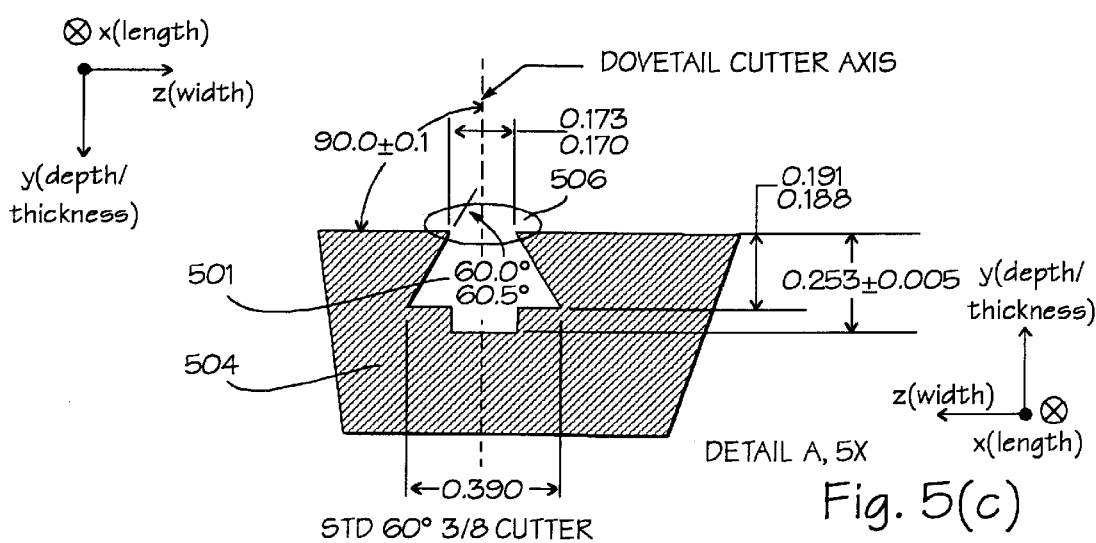
Figure 5D:
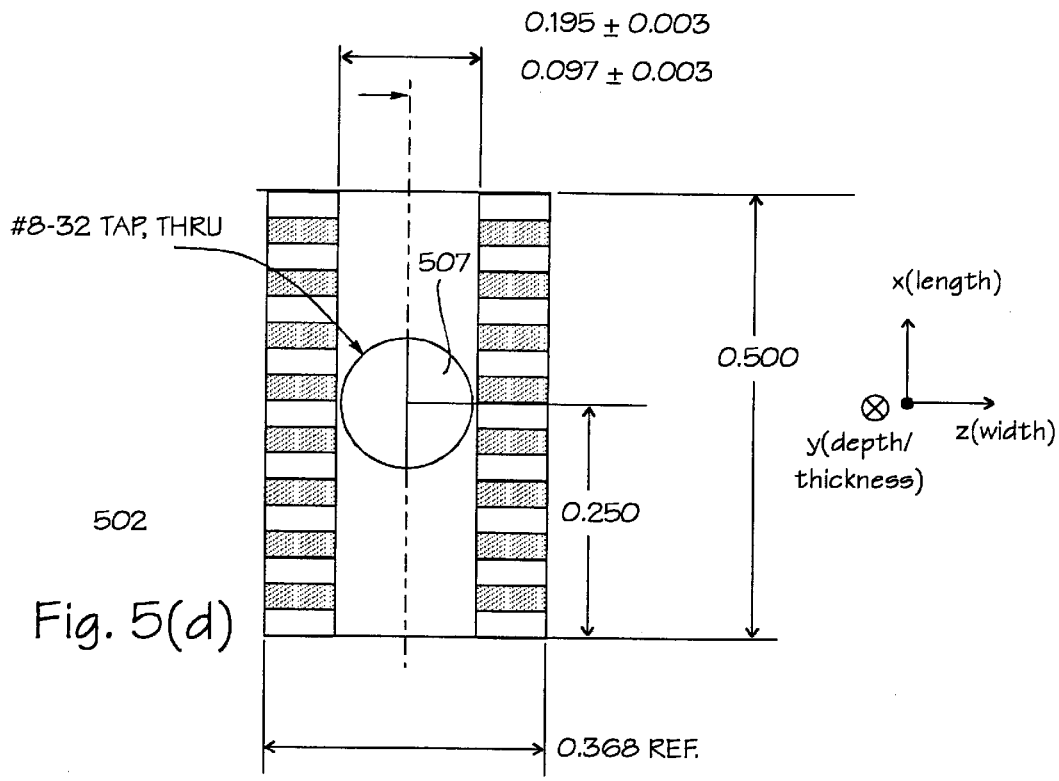
FIGS. 5d and 5e are illustrations of a preferred centering element.
Figure 5E:
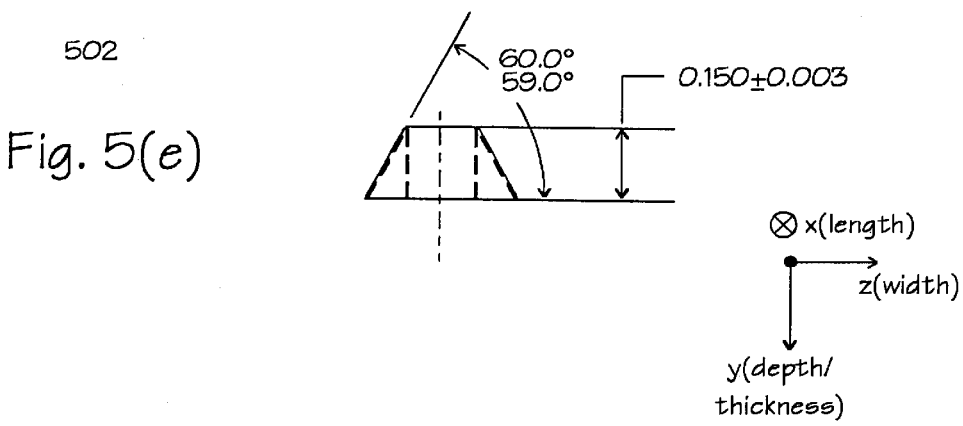

The preferred embodiment, shown in FIGS. 5a through 5f, meets all the above requirements. Referring to FIGS. 5a through 5c, the tracks 501 are cavities that are milled into the mounting plane 504. The mounting plane 504 can be a plate of black anodized aluminum. The cavities 501 run along the length of the mounting plane 504 and are milled within a tolerance of 0.002"–0.003" by standard CNC (Computer Numerically Controlled) machining equipment. Because the tracks 501 are formed by standard machining equipment, the manufacturing cost of the mounting plane is minimized. The centering elements 502, shown in FIG. 5b, are trapezoidal or dovetail shaped nuts (dove nuts) that fit within the cavity 501 and may enter the track 501 on either end 505 of plane 504. Because the depth of the cavity 501 (0.188"0.191") is greater than the thickness of the dove nut 502 (0.147"–0.153") the dove nuts 502 slide easily within the cavity 501. Thus the dove nuts 502 may be placed at any continuous location along the track 501. The dovetailed shapes of the cavity 501 and dove nut 502 are for anchoring the centering elements 502 with high precision. This aspect of the mounting plane system is discussed later. The thickness of the mounting plane is any thickness sufficient to prevent bowing of the plane 504 due to the presence of the cavities 501.

FIGS. 6a through 6d show alternate embodiments. In the second embodiment, shown in FIGS. 6a through 6c, the mounting plane is a concept as opposed to a physical element. That is, the tracks 601 are cavities that are milled into metal extrusions 606. The extrusions 606 are then fitted, with the assistance of dowel pins 607, into a larger framework 608 that is capable of holding multiple extrusions 606. Dove nuts 602 similar to those used in the preferred embodiment are also used in the second embodiment. In the third embodiment, shown in FIG. 6d, extrusions have been replaced by rails 609. Thus there is no cavity. Also, instead of dove nuts, locator bars 610 are used as the centering elements that glide along the rails and anchor the modular blocks to the rails.

An additional requirement of the mounting plane concept is the ability to mount or anchor the modular blocks with high precision. As depicted back in FIGS. 5a and 5b, the preferred embodiment includes a narrowing cavity 501 within the planar structure 504 and an anchoring element (a dove nut, 502) that slides into the cavity 501 such that the threaded hole 507 of the dove nut 502 is nearly perfectly centered (within tolerances of +/−0.003") with respect to the width of the opening 506 of plane 504. As FIG. 5c shows, modular blocks 512 have through holes 514 through which bolts 513 are placed and then threaded into the threaded hole 507 of dove nut 502. In this manner, modular blocks 512 are mounted to the mounting plane 504 with comparable placement tolerance on the plane as the dove nut 502. Most modular blocks 512 have at least four through holes 514 which mount bolts 513 to dove nuts 502 that are placed in at least two different tracks/cavities 501.

Figure 5F:
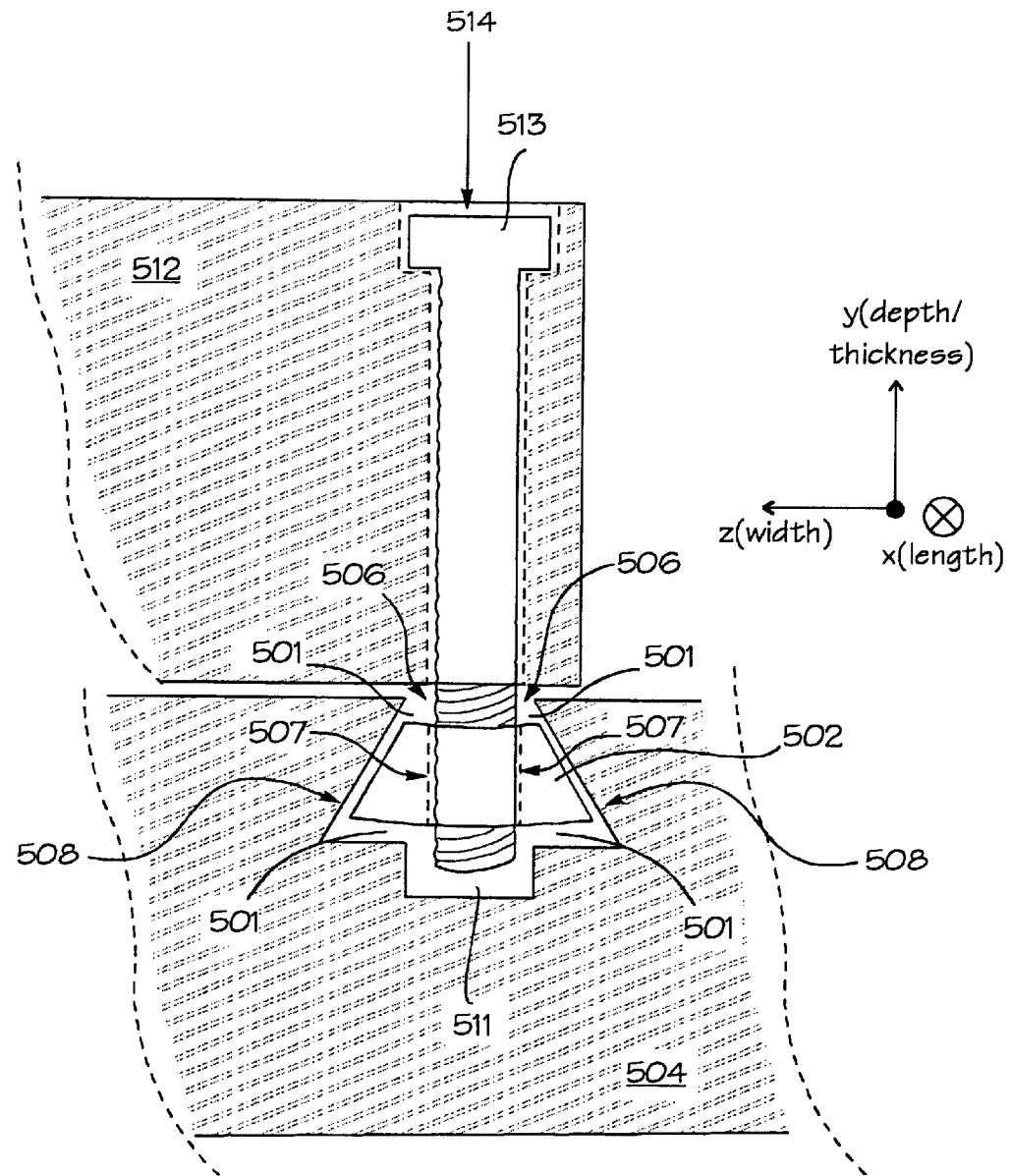
FIG. 5f is an illustration of a modular building block centered in the mounting plane.
Figure 6A:
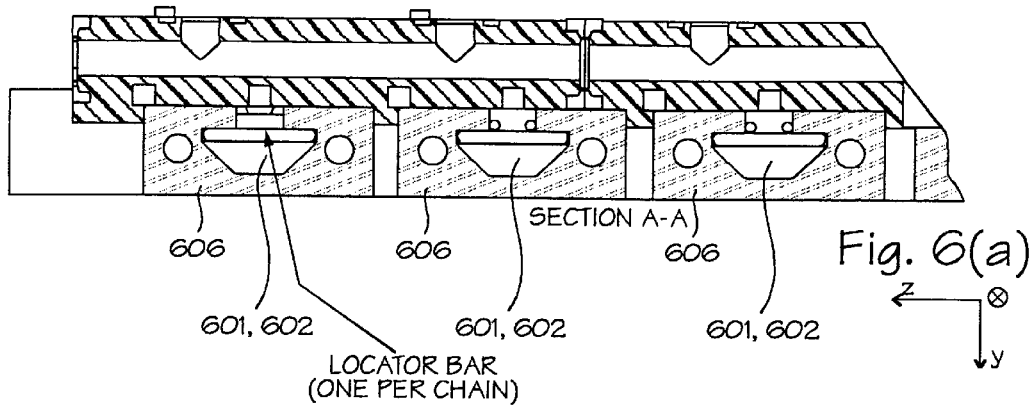
FIGS. 6a, 6b and 6c are schematic illustrations of a second embodiment of the present invention.
Figure 6B:
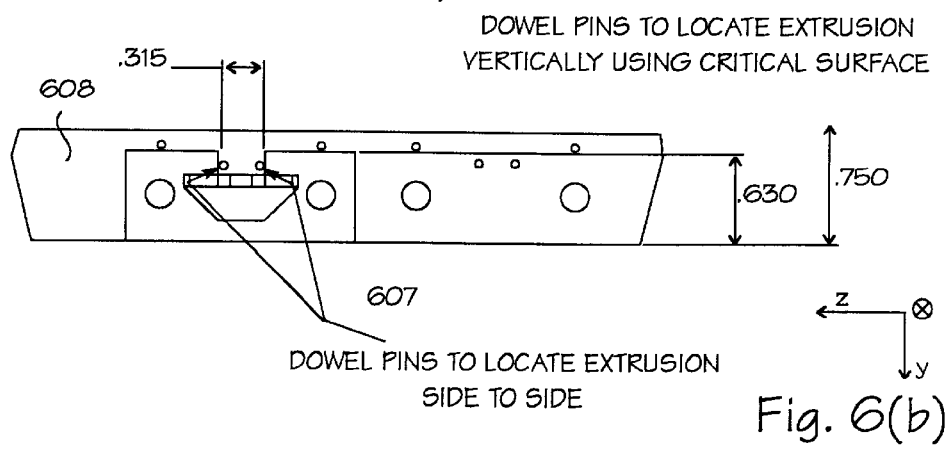
Figure 6C:
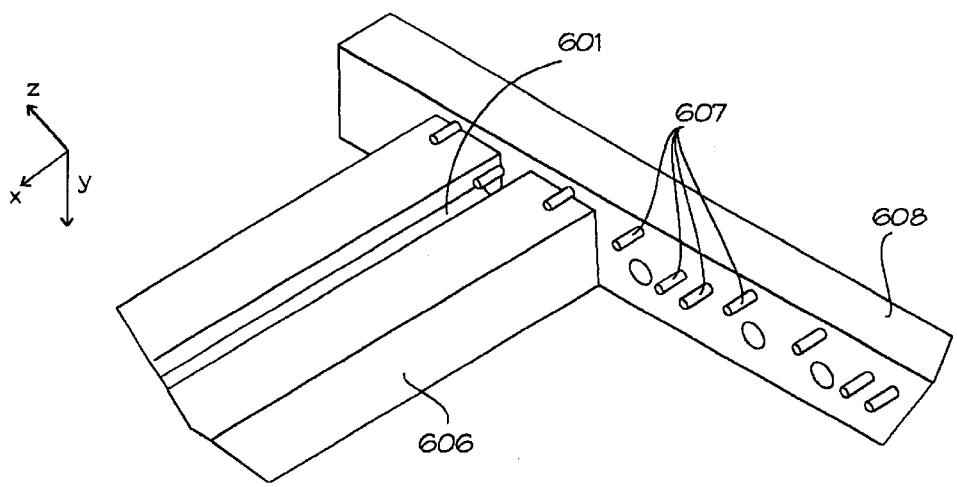
Figure 6D:
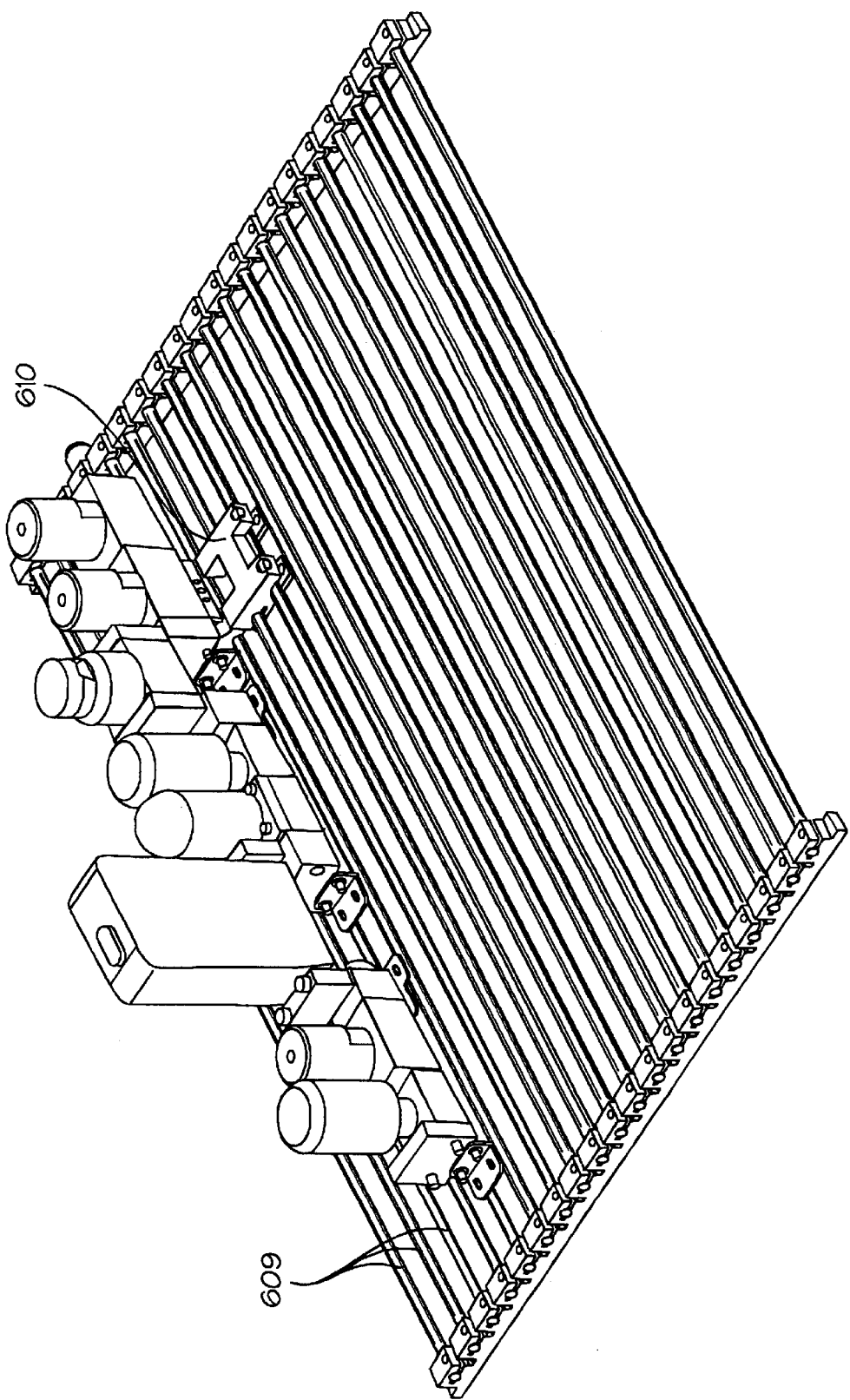
FIG. 6d is a schematic illustration of a third embodiment of the present invention.

The relative geometries of the cavity 501 and the dove nut 502 is critical to the mounting plane's ability to precisely place the threaded hole 507 of each dove nut 502 in the center of opening 506. As FIGS. 5a through 5e show, both the cavity 501 and the width of the dove nut 502 taper or narrow inward at an angle of approximately 60 degrees. The threaded hole 507 of the dove nut 502 is centered in the opening 506 of the plane 504 by moving the dove nut 502 into the cavity 501 in the direction of the cavity's 501 narrowing width until the dove nut 502 is snug against the surface of the cavity 508. This movement is easily performed by the activity of threading the hole 507 with the bolt 513 (refer to FIG. 5c). As FIG. 5f shows, the head of bolt 513 is wider than the hole 514 that bolt 513 is inserted into. As a result, as the bolt 513 is threaded into dove nut 502, the position of bolt 513 is fixed and dove nut 502 slides upward into cavity 501 toward the opening 506. This movement continues with the threading until the dove nut 502 is snug. FIG. 5f shows the dove nut 502 snug against the surface of the cavity 508. In this manner, the dove nut's threaded hole 507 and bolt 513 are "self" centered in opening 506.

It is important to note that the concept of placing an element with high precision by use of a narrowing cavity is applicable to numerous alternate embodiments. That is, different geometries than those of the preferred embodiment will still enable the highly precise placement of an element. For example, a different angle than 60 degrees; or even a different shape altogether such as cylindrical cavity and centering element are all acceptable alternatives. The second alternate embodiment, shown back in FIG. 6a, has a region that narrows in a direction opposite to the opening in the mounting plane. This embodiment is capable of self centering if the bolt used to thread the dove nut is nearly the same as the width of the opening in the mounting plane.

The mounting plane design also accounts for additional functional and manufacturing requirements that are related to the self centering mechanism. These include: 1) ensuring that, in a high volume manufacturing environment, all manufactured dove nuts 502 will fit within all manufactured cavities 501 and that, for each dove nut 502 and cavity 501, the self centering capability is preserved; 2) preventing slippage of the dove nut 502 inside the cavity 501 once a modular block is mounted to it; and 3) preventing dove nut 502 from slipping through opening 506 such that accurate centering of the bolt 513 is lost.

As discussed, the ideal design of the mounting-plane centering mechanism equates the angle of the cavity's 501 taper with the angle of the taper of the dove nut's 502 width. However, as a result of the unavailability of an affordable manufacturing process that mills the cavity 501 and dove nut 502 with zero tolerance, the mounting plane design must account for the possibility that either the cavity 501 or dove nut 502 may not be milled at exactly 60 degrees. That is, if the design point for the taper of both the cavity 501 and the dove nut 502 was 60 degrees, with current affordable manufacturing processes, it is likely that the angle of the taper for many dove nuts 502 would exceed the angle of the taper for the cavity 501. In this instance the dove nut 502 will not fit inside the cavity 501 and a percentage of dove nuts 502 would have to be scrapped. Therefore the angle at which the cavity 501 is milled is slightly offset from the angle at which the dove nut 502 is milled. Specifically, the cavity 501 is milled at angles between 60.0 and 60.5 degrees and the angle of the dove nut 502 is milled at angles between 59.0 and 60.0 degrees. This guarantees that all manufactured dove nuts 502 will fit inside all manufactured cavities 501. Furthermore, this guarantees that the self centering capability is preserved. Under worst case conditions (e.g. 60.5 degree cavity 501 and a 59.0 degree dove nut), when bolt 513 is tightened, dove nut 502 is sufficiently snug in cavity 501 such that bolt 513 is still centered in opening 506. Obviously, depending on the geometry chosen for the cavity and centering element, many different embodiments are conceivable where the tapered angles of the cavity and centered element differ slightly in order to guarantee a high manufacturing yield and maintain the self centering capability.

Because the modular blocks are used to create ultra clean gas systems, once a modular block is mounted to a dove nut 502 it is imperative that the modular block stays fixed in place. Therefore the mounting plane design includes grooves 509 on the surface of the dove nut 502. These grooves simply increase the friction of the interface between the dove nut 502 and the cavity 501 thus movement of the dove nut 502 within the cavity, after the modular block has been anchored, is not a concern. Furthermore, the dove nut 502 is made of 304 stainless steel and the plane 504 is made of Ryerson M6 aluminum. Thus the dove nut 502 is made of a harder material than the plane 504. This allows the dove nut to bite into the plane which further increases the friction of the interface. Obviously many different embodiments exist regarding proper materials for dove nuts 502 and planes 504. The principle concept is that the dove nut 502 is harder than the plane 504.

Another functional requirement of the mounting plane design is preventing dove nut 502 from slipping through opening 506 such that accurate centering of the bolt 513 and proper fastening is lost. In order to meet this requirement, the smallest width of the dove nut 502 is larger than the opening 506 (refer to FIG. 5f). That is, if the narrowest width of the dove nut 502 was equal to the width of the opening 506, an edge of dove nut 502 could slip through the opening 506. This would orient the dove nut 502 such that proper self centering and fastening of the dove nut 502 would be lost. Under the preferred embodiment, the narrowest width of the dove nut is 0.195"+/−0.003" and the width of the opening 506 is between 0.170" and 0.173". Embodiments where the cavity narrows in a direction away from the opening do not have this requirement as there is no tip region. In such an embodiment, the cavity is surrounded by the plane material on all sides where the centered element is pressed snug against the cavity.

As is well known in the art, the thickness of the dove nut 502 need not be larger the diameter of the bolt. Under the preferred embodiment, the dove nut's thickness is 0.15" and the threaded hole is 8–32 UNC 2B. The threaded hole 507 is centered on the dove nut 502 and extends through the thickness 512 of the dove nut 502. The length of the dove nut 502 is 0.500".

A fourth desired featured of the mounting plane system is the ability to hold dove nuts in place in the cavity against a variety of undesired forces that would tend to move the centering element along the track (e.g. gravity, or an accidental "bump" against the mounting plane). A principal motivation for the mounting plane is to quickly and easily rebuild a gas panel. In order to facilitate the rapid reconfiguration of a gas panel, it is necessary in such a case to have a mechanism such that the dove nuts 502 do not slide along the cavities 501.

Figure 7A:
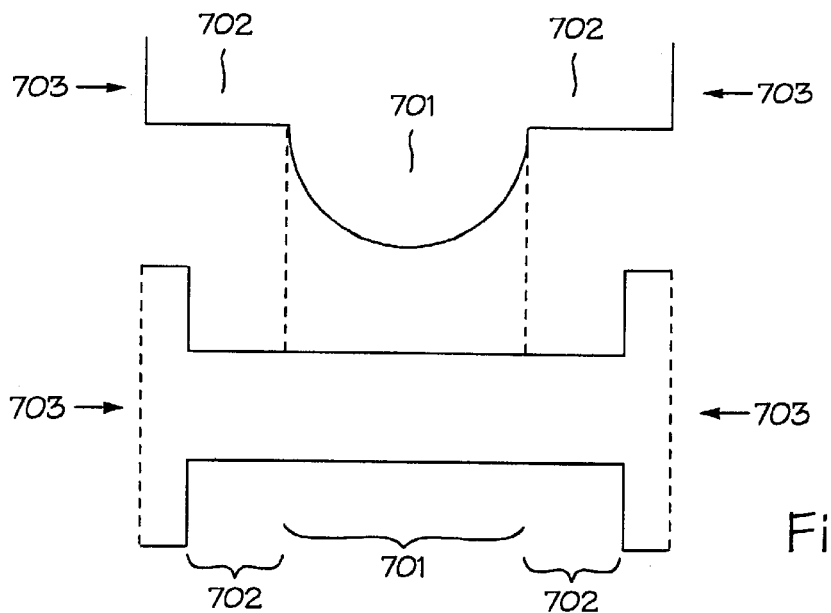
FIGS. 7a and 7b are illustrations of a spring used to hold a centering element in place.

FIG. 7a shows a spring 700 used to press the dove nut 707 into the cavity, toward the cavity opening 706, with sufficient force such that the dove nut 707 does not slide down the length of the cavity due to an undesired force. The spring 700 has a bowed region 701, two stem regions 702 and two tab regions 703. Under the preferred embodiment, it is critical that the spring constant is: 1) high enough to hold the dove nut 502 in place against an undesired force and 2) low enough to easily separate the dove nut 502 from the cavity surface 508 so that the dove nut 502 may be easily moved up and down the lengths of the cavities 501. The spring constant increases as 1) the bulk modulus increases; 2) the radius of curvature for the bowed region 702 decreases and 3) the thickness of the material used for the spring increases. The preferred embodiment uses a spring having beryllium copper as its material, a radius of curvature of 0.226" and a thickness of 0.005". The width of the bowed region 701 is 0.150".

Figure 7B:
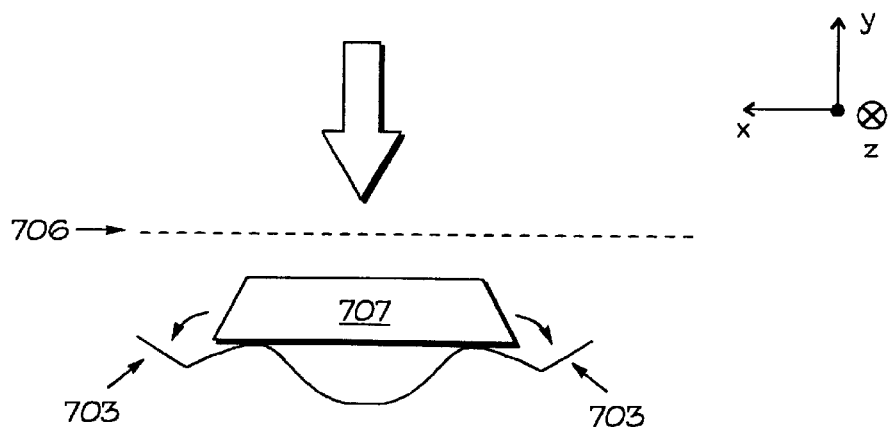

The stem regions 702 of the spring are 0.075" and the tab regions 703 are 0.078". The purpose of the tab regions 703 is to keep the spring attached to the dove nut 707 while the dove nut is in the cavity. Thus the width of the tabs must be sufficient to catch a wide area of the ends of the dove nut 707. As FIG. 7b shows, when it is desired to move the dove nut along a cavity 702 length, the spring is disengaged simply by pressing the dove nut 707 away from the opening 706. The tabs 703 move away from the edges of the dove nut 707 when the dove nut is pressed in this manner. In the preferred embodiment, the tab widths are 0.216" and the tab lengths are 0.078".

Referring back to FIG. 5f, a guide 511 is shown that is milled in the plane 504 adjacent to the cavity 501. There are two purposes to guide 511. First, guide 511 guides the spring and keeps it in place at all times when the dove nut 502 is inside the cavity 501. The width of bowed region 701 (ref. FIG. 7) is slightly less than the width of guide 511 so that dove nut 502 does not rotate around the y axis in the cavity 501. Second, guide 511 prevents bolt 513 from "bottoming out" or touching the mounting structure 504. The width of the guide is between 0.170" and 173". This is equal to the width of the opening 506 and makes manufacturing of the plane 504 less complicated.

Thus, a novel mechanism of mounting a set of blocks has been described which allows the flexible configuration of weldless and tubeless gas panels.

We claim:

1. An apparatus comprising:
   (a) a first element, said first element's width narrowing along said first element's thickness axis;
   (b) a second element having a cavity and an opening exposing said cavity, said first element shaped to fit at least partially into said cavity, said cavity width narrowing along said cavity's depth axis;
   (c) said first element's width axis parallel to said cavity's width axis, said first element's thickness axis parallel to said cavity's depth axis; and
   (d) a modular block mounted to said second element, said modular block coupled to said first element such that said first element's smallest width is larger than said cavity's smallest width in a region where said first element is pressed against said cavity, said modular block having at least one neighboring modular block such that said neighboring modular block and said modular block are in fluid communication.

2. The apparatus of claim 1 further comprising said cavity width narrowing toward said opening.

3. The apparatus of claim 1 wherein said modular block is a modular block for use in a modular gas system.

4. The apparatus of claim 1 wherein said first element has grooves for increasing the friction between said first element and said second element.

5. The apparatus of claim 1 wherein said first element material has a hardness different than said second element material.

6. The apparatus of claim 5 wherein said first element is composed of a harder material than said second element.

7. The apparatus of 1 wherein said first element's width narrows at a slightly greater rate than said cavity width narrows.

8. The apparatus of claim 1 wherein said first element is a dove nut.

9. The apparatus of claim 1 wherein said second element is a planar structure.

10. The apparatus of claim 9 wherein said planar structure is a plate.

11. The apparatus of claim 1 wherein said second element further comprises a guide, said guide adjacent to said cavity.

12. The apparatus of claim 11 wherein said second element surrounds said cavity and said guide on all sides except at said opening.

13. The apparatus of claim 11 wherein said guide further comprises a spring within said guide.

14. The apparatus of claim 1 wherein a third element attached to said first element is centered in said opening width, said opening width axis parallel to said first element's thickness axis and said second element's thickness axis.

15. The apparatus of claim 1 further comprising said first element width narrowing at 59 to 60 degrees and said cavity width narrowing at 60.0 to 60.5 degrees.

16. The apparatus of claim 1 further comprising said first element formed such that said first element is capable of moving in said cavity along said cavity length axis.

17. An apparatus comprising:
   (a) an anchoring element, said anchoring element's width narrowing along said anchoring element's thickness axis;
   (b) a plate having a cavity and an opening exposing said cavity, said anchoring element shaped to fit at least partially into said cavity, said anchoring element shaped to move easily and continuously in said cavity in either direction along said cavity length axis, said cavity width narrowing along said cavity's depth axis at a rate less than said anchoring element's thickness narrows;
   (c) said anchoring element's width axis parallel to said cavity's width axis, said anchoring element's thickness axis parallel to said cavity's depth axis;

(d) a modular block mounted to said plate, said modular block coupled to said anchoring element such that said anchoring element's smallest width is larger than said cavity's smallest width in a region where said anchoring element is pressed against said cavity; and (e) a neighboring modular block mounted to said plate such that said neighboring modular block and said modular block are in fluid communication.

18. The apparatus of claim 17 wherein said modular block is a modular block for use in a modular gas system.

19. The apparatus of claim 17 wherein said anchoring element has grooves for increasing the friction between said anchoring element and said plate.

20. The apparatus of claim 17 wherein said anchoring element material has a hardness different than said plate material.

21. The apparatus of claim 20 wherein said anchoring element is composed of a harder material than said plate.

22. The apparatus of claim 17 wherein said anchoring element is a dove nut.

23. The apparatus of claim 17 wherein said plate further comprises a guide, said guide adjacent to said cavity.

24. The apparatus of claim 23 wherein said anchoring element surrounds said cavity and said guide on all sides except at said opening.

25. The apparatus of claim 23 wherein said guide further comprises a spring within said guide.

26. The apparatus of claim 17 wherein a bolt attached to said anchoring element is centered in said opening width, said opening width axis parallel to said anchoring element's thickness axis and said plate's thickness axis.

27. The apparatus of claim 17 further comprising said anchoring element width narrowing at 59 to 60 degrees and said cavity width narrowing at 60.0 to 60.5 degrees.

28. A method comprising:

(a) inserting a first element in a cavity, said cavity in a second element, said first element's width narrowing along said first element's thickness axis, said cavity's width narrowing along said cavity's depth axis, said first element's width axis parallel to said cavity's width axis, said first element's thickness axis parallel to said cavity's depth axis; and (b) mounting a modular block to said second element by coupling said modular block to said first element such that said first element moves in the direction of said narrowing cavity width while said modular block is being coupled to said first element, said cavity width substantially non varying along said cavity's width axis, said first element width substantially non varying along said first element's width axis; and (c) introducing a fluid flow into said modular block.

29. The method of claim 28 wherein said coupling further comprises placing a threaded bolt through a hole within said modular block and threading said threaded bolt into a threaded hole within said first element.

* * * * *